UNITED STATES PATENT OFFICE.

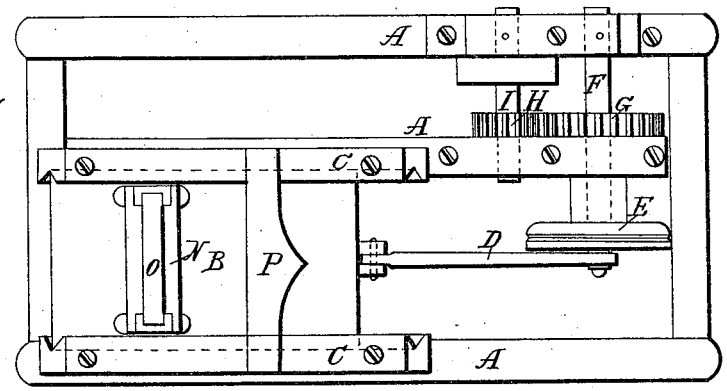
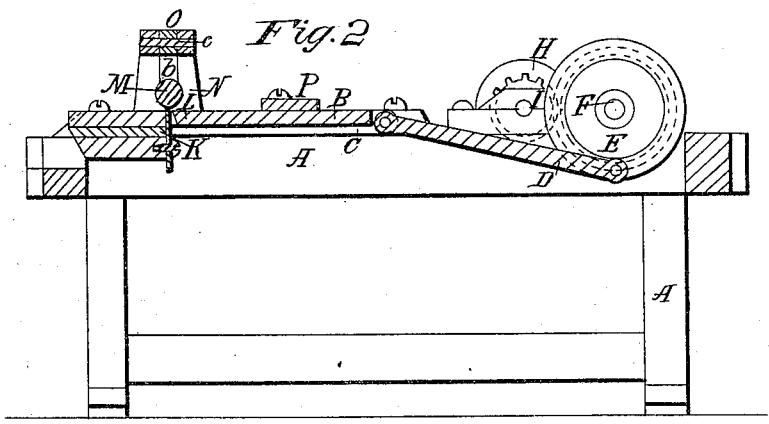
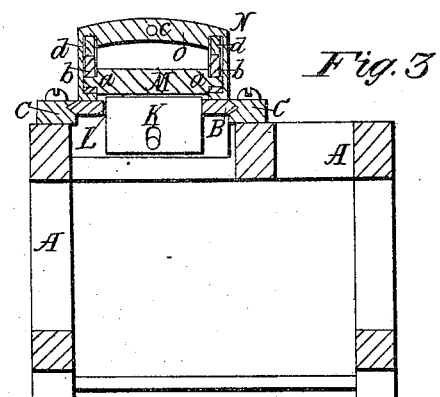

ERASTUS S. FRENCH, OF HUBBARDSTON, MASSACHUSETTS, ASSIGNOR TO HIMSELF AND LUKE SAWYER, OF SAME PLACE.

IMPROVEMENT IN MACHINES FOR SCRAPING CHAIRS AND OTHER ARTICLES.

Specification forming part of Letters Patent No. 44,367, dated September 20, 1864.

*To all whom it may concern:*

Be it known that I, ERASTUS S. FRENCH, of Hubbardston, in the county of Worcester and State of Massachusetts, have invented a new and useful machine for scraping chair-stuff, or portions of chairs or various other articles; and I do hereby declare the same to be fully described in the following specification and represented in the accompanying drawings, of which—

Figure 1 is a top view, and Fig. 2 a longitudinal and vertical section, of such machine. Fig. 3 is a transverse section of it, such section being taken through the pressure-roller, to be hereinafter described.

In the drawings, A denotes the frame of the machine as provided with a movable carriage or platform, B, which is arranged between and supported by parallel ways C C, and so as to be capable of being slid longitudinally on them. The mechanism for imparting to the said platform a reciprocating motion may be thus described: A connecting-rod, D, is jointed to the platform B, and also to a crank wheel, E, fixed on one end of a shaft, F. On the said shaft F is a spur-gear, G, which engages with another gear, H, fixed on a driving-shaft, I, the whole being arranged within and suitably supported by the frame A. The carriage or platform B has a metallic scraper, K, fitted to it and extending upward within and through a throat, L, made through the carriage. Over the scraper there is a pressure-roller, M, which has its journals *a a* supported in boxes *b b*, which are so adapted to a frame, N, erected on the platform B, as to be capable of being freely slid vertically therein. In the upper part of the said frame N there is a rocker bar or lever, O, which is supported on a pin or fulcrum, *c*, which goes through the said bar O and the frame N. Furthermore, between each box *b* and the bar O there is an india-rubber or other proper spring, *d*. A rest or bar, P, extends across the carriage or platform B, and is bolted down upon or fixed to the top of the ways C C, and serves to complete the machine, which may be said to consist of the movable carriage, its scraper and pressure-roller, and the fixed or stationary rest, the whole being arranged and applied together and to the frame A, and having mechanism for imparting to the carriage a reciprocating longitudinal motion.

In operating with this machine the chair-back or article to be scraped is to be laid on the carriage or platform B, and between the stationary rest and the pressure-roller. During the backward movement or retreat of the platform the said chair-back or article to be scraped will not only be borne against the rest P, but will be forced between the pressure-roller and the upper edge of the scraper, and so as to cause the latter to scrape the lower surface of such chair-back.

From the above it will be seen that the movable platform carries both the scraper and the pressure-roller and moves them relatively to the stationary rest. It will also be observed that by means of the rocker-bar O, combined with the pressure roller, its springs, boxes, and carrying frame, the said roller is enabled to tilt and accommodate itself to the varying form of the chair-back, and maintain its equality of pressure on it, so as to cause the scraper to cut or scrape evenly over or across the entire surface exposed to its action. The chair-back will remain on the carriage and underneath the pressure roller during the advance movement of the carriage; but on the next retreat of the carriage or platform the said chair-back will be forced from underneath the pressure-roller by the next succeeding chair-back, which, for the purpose of being scraped, may be placed on the platform.

I claim—

1. The machine, as consisting of the movable carriage, its scraper and pressure-roller, and the fixed or stationary rest, as arranged and applied together and to the frame A, substantially as described, and having mechanism for imparting to the carriage reciprocating motions in manner as specified.

2. The combination of the rocker-bar O with the pressure-roller, its springs, boxes, and carrying frame, when combined with the movable carriage or platform, its scraper, and the stationary rest, substantially in manner and so as to operate as explained.

ERASTUS S. FRENCH.

Witnesses:
GEO. GREENWOOD,
S. W. A. STEVENS.